June 14, 1955  T. B. WEBB  2,710,443
METHOD OF MAKING A RESTRICTED ORIFICE TUBE JOINT
Filed May 25, 1950

INVENTOR
THOMAS B. WEBB
BY
ATTORNEY

United States Patent Office 2,710,443
Patented June 14, 1955

2,710,443

METHOD OF MAKING A RESTRICTED ORIFICE TUBE JOINT

Thomas B. Webb, Beckenham, England, assignor to The Babcock & Wilcox Company, Rockleigh, N. J., a corporation of New Jersey Application May 25, 1950, Serial No. 164,151

Claims priority, application Great Britain June 7, 1949

3 Claims. (Cl. 29—157.4)

This invention relates to heat exchangers and, more particularly, to heat exchangers of the type comprising a pressure vessel to which a plurality of fluid conducting tubes are connected. When a heat exchanger or fluid heater such as an economizer, a boiler, or a superheater includes a plurality of parallel-connected tubes, the difficulty sometimes arises of establishing or maintaining a proper distribution of the working fluid between the tubes and, for the purpose of ensuring such distribution, flow restrictors have been used in the form, for example, of plugs formed with restricted orifices which have usually been fitted at the inlet ends of the tubes.

Frequently in modern vapor generating and superheating units the pressure vessels such as boxes, headers or drums are required to withstand high pressures, frequently accompanied by high temperatures, and the reduction of first cost and the enhancement of the reliability of such vessels and their connections are matters of no little importance.

An object of the invention therefore is the provision of flow restrictors in a manner favorable to economy in the manufacture of high pressure vessels and their connections. Another object is to provide a method of manufacture of vessels having tubular connections associated with orifices which favors reliability in operation.

In accordance with the foregoing objects, the invention is embodied, for example, in a heat exchanger comprising a vessel and a bank of tubular members each connected at one end to the vessel. Each of a plurality of the tubular members is united by welding to the vessel, and orifices formed in the metal of the vessel respectively provide restricted passages between the interior of the vessel and the interiors of the tubular members thus united.

When this construction is applied to a vessel of small cross-sectional area, such as a superheater header, the need for providing the vessel with access openings opposite the respective tube ends for the insertion of separate plug-type flow restrictors is avoided. The avoidance of loose plug-type restrictors and of access opening sealing covers increases the reliability of the installation and reduces the initial cost of the heat exchanger. Furthermore, since the tube is welded to the vessel and no tube seat is required into which the tube end may be expanded, it is unnecessary to make any part of the associated hole in the vessel of a diameter larger than is requisite from considerations of fluid flow and, moreover, at least a part of this hole is formed as a restricted passage. As a result, when the tubes of a group are provided with flow restricting means in this manner, a relatively high ligament strength may be obtained, so that for a given pressure and thickness of vessel wall the tubes may be more closely spaced at their points of attachment to the vessel. In those cases where a large proportion of the tubes is provided with such restricting means the thickness of the wall to operate at a particular pressure may be reduced or, if the wall is maintained at a particular thickness, the vessel may be safely subjected to a higher pressure than would otherwise be the case.

In a particular embodiment of my invention, the tubes associated with flow-restricting orifices in a vessel wall are initially formed with stub tubes or stub tube parts separate from the main tube parts, and the stub tubes are united to the vessel by fusion welding. After the stub tubes have been welded in place, the vessel may be stress relieved at the factory and subsequently, on site, the stub tubes may be welded to the main tube parts and the welds between the stub tubes and main tube parts stress relieved without difficulty.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Figs. 2 and 2A are sectional views of part of a vessel wall and illustrate one manner in which the flow restrictors shown in Fig. 1 may be provided;

Figs. 3 and 3A are sectional views of part of a vessel wall and illustrate a second manner in which the flow restrictors shown in Fig. 1 may be provided; and Figs. 4 and 4A are sectional views of part of a vessel wall and illustrate a third manner in which resistors of the same general type as those shown in Fig. 1 may be provided.

Figure 1:
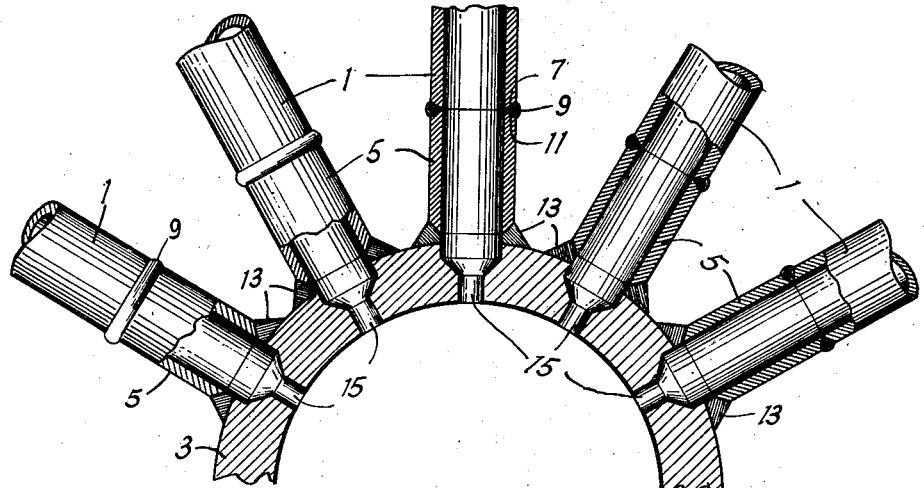
Fig. 1 is a fragmentary transverse cross-sectional view of a heat exchanger header and tube assembly constructed in accordance with my invention.

Referring to Fig. 1 of the drawings, a plurality of main heat-exchange tube parts 1 are connected to the header 3 by means of stub tube parts 5, the header constituting a vessel of relatively small diameter. Each main tube part 1 is provided with a chamfered end 7 fusion welded in abutting relationship at 9 to a chamfered end 11 of the associated stub tube part 5. The opposite end of each stub tube part 5 is fusion welded to the outer surface of the vessel 3 as indicated at 13 by one of the methods set out below in connection with Figs. 2 to 4A of the drawings.

Communication between the interior of the vessel and the interiors of the different tubes is provided by restricted passages 15 formed in the metal of the vessel as described below. Although only one passage is shown for each tube, two or more passages may be provided, and may extend either radially as shown or at any desired inclination.

Figure 2:
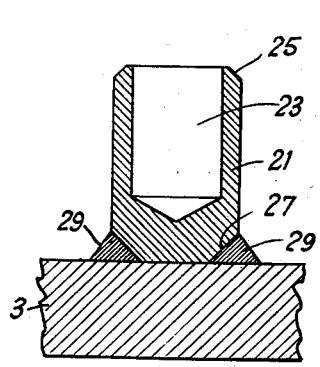

Referring to Figs. 2 and 2A, one manner of providing the stub tube parts 5 and the associated restricted passages 15 is as follows. A stub 21 of cylindrical shape and provided with a blind bore 23, extending concentrically with the outer wall of the stub from one end toward the opposite end and of a diameter equal to the inside diameter of the tube which it is desired to connect to the vessel 3, is provided at its open end with a chamfered welding surface 25 and at the closed end with a chamfered welding surface 27 extending inwardly from the periphery of the stub for a distance greater than the intended final thickness of the wall of the stub. The stub is held with its closed end in contact with the outer surface of the vessel in the desired position, and the stub is united to the vessel by fusion welding, weld metal being deposited at 29 in the groove bounded by chamfered surface 27 and the vessel wall. The inner end of the stub is now bored out (see Fig. 2A) to a diameter equal to the inside diameter of the associated tube, and the bore is continued for a short distance into the outer surface of the vessel wall, as at 31, in order to remove the "root" part of the weld metal deposited at 29, the bore extension 31 terminating in a conical end surface, as shown. It is well known that, even when a weld is skillfully performed, the "root" part of the weld is not always of the same uniform quality as the remainder, and by making a relatively deep weld and subsequently removing the "root" part, a skilled welder can ensure that the whole of the finished weld is uniformly sound. The orifice through the wall of the vessel is then completed by drilling through the inner part of the vessel wall a hole 33 considerably smaller in diameter than the bore of the stub, whereby a restricted passage is provided between the interior of the vessel and the interior of the stub.

Although in the preferred embodiment described above fusion welding is used to unite the tube parts to the vessel, the stub tube parts may if desired be resistance or flash butt welded to the pressure vessel.

Figure 3:
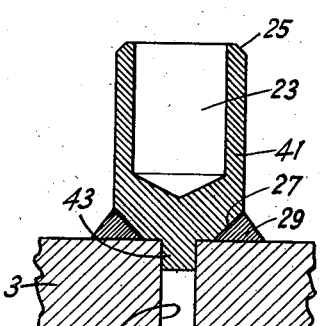

To simplify the initial location of the stub on the vessel during the fusion welding operation, the construction illustrated in Figs. 3 and 3A may be used. The stub 41 is of the same shape as that shown in Fig. 2, except that it is provided at its closed end with an external axially extending short spigot 43 of the same diameter as that of the restricted passage it is proposed to form in the wall of the vessel. When the modified stub 41 is to be used, the restricted passage 45 is first drilled through the wall of the vessel in the desired position and spigot 43 is inserted into an outer end portion of the passage. The welding and boring-out operations are then carried out as described in connection with the stub 21 above, the boring operation resulting in the removal of spigot 43.

Figure 4:
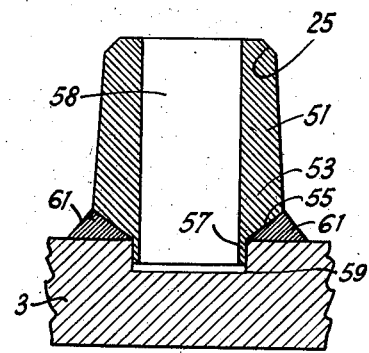
Figure 2:
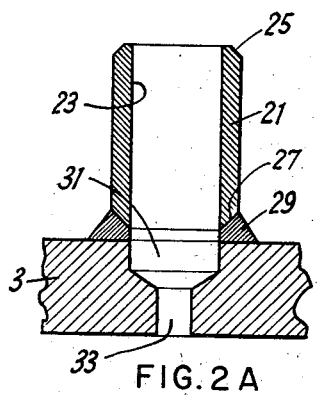
Figure 3:
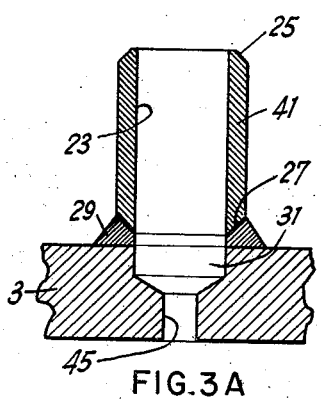
Figure 4:
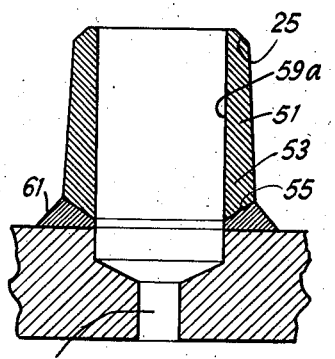

Figs. 4 and 4A illustrate a further modification which is particularly applicable to heat exchangers in which large bore tubes are used. The stub 51 is not truly cylindrical, having a larger diameter near one end than at the other end. The end 53 having the larger diameter is provided with a chamfered welding surface 55 extending inwardly from the periphery of the stub for a distance greater than the intended final thickness of the wall of the stub at this part of its length. At the inner edge of surface 55 is a thin, short, longitudinally extending annular flange 57. Additionally, the stub is bored from end to end as at 58 before application to the vessel, and is provided at the end having the lesser diameter with a chamfered welding surface 25.

In order to secure a stub 51 to the vessel, a shallow hole 59 is drilled in the outer surface of the vessel, at the appropriate location, of such diameter as to fit the flange 57 on the stub, the flange is fitted into the hole and the stub is united to the vessel by fusion welding, weld metal being deposited at 61 in the groove bounded by chamfered surface 55 and the vessel wall.

After the welding operation is completed, the stub 51 and the hole 59 are drilled out to a diameter 59a, larger than the outer diameter of the flange, so as to remove the "root" part of the weld metal deposited at 61 and the whole of the flange 57. When using this third embodiment of the invention, the restricted passage 63 may be drilled through the wall of the pressure vessel either before or after the stub is welded to the vessel.

While in accordance with the provisions of the statutes I have illustrated and described herein the best form of the invention known to me, those skilled in the art will understand that changes may be made without departing from the spirit of the invention covered by my claims, and that certain features of my invention may sometimes be used to advantage without a corresponding use of other features.

I claim:

1. The method of making a connection between the interior of a tubular member and the interior of a vessel through a restricted orifice which comprises forming an annular chamfered surface at one end of a tubular stub having an initial bore extending only partially therethrough toward said one end which constitutes the base of the stub, positioning said stub with its chamfered surface outwardly adjacent a wall of the vessel so as to define therewith an annular welding space of which the inner diameter is less than the diameter of said initial bore, joining said stub to said wall by fusion depositing weld metal circumferentially of the stub within said annular welding space, removing weld metal from the root of the weld by a boring operation initiated within the stub and continuing at substantially the same diameter as said initial bore throughout the remaining length of the stub and for a short distance into the vessel wall to form an unrestricted portion of said connection, and forming in the remaining thickness of the vessel wall an orifice which provides communication between the interior of the vessel and the bore of the stub, said orifice being of restricted cross section relative to said bore which forms said unrestricted portion of said connection.

2. The method of making a connection between the interior of a tubular member and the interior of a vessel through a restricted orifice which comprises forming an annular chamfered surface at one end of a tubular stub having an initial bore extending only partially therethrough toward said one end which constitutes the base of the stub, forming said stub with a spigot extending axially from said base, positioning said stub with said spigot received in a hole formed in the wall of the vessel and with said chamfered surface outwardly adjacent said wall so as to define therewith an annular welding space of which the inner diameter is less than the diameter of said initial bore, joining said stub to said wall by fusion depositing weld metal circumferentially of the stub within said annular welding space, removing weld metal from the root of the weld by a boring operation initiated within the stub and continuing at substantially the same diameter as said initial bore throughout the remaining length of the stub and for a sufficient distance into the vessel wall to remove said spigot and simultaneously form an unrestricted portion of said connection, the portion of the hole through the remaining thickness of the vessel wall forming an orifice which provides communication between the interior of the vessel and the bore of the stub, said orifice being of restricted cross section relative to said bore which forms said unrestricted portion of said connection.

3. The method of making a connection between the interior of a tubular member and the interior of a vessel through a restricted orifice which comprises forming a shallow, circular, external recess in a wall of the vessel at the location of the intended connection, forming a tubular stub with an initial bore extending completely therethrough and with a short annular flange surrounding the bore and adapted to fit into the recess so as to locate the stub in the correct position on the vessel prior to joining said stub to said wall, said initial bore being smaller than the intended bore diameter of the stub, forming the stub with an annular chamfered surface extending from the base of said annular flange, positioning said stub with its flange received in said recess and with its chamfered surface outwardly adjacent the vessel wall so as to define therewith an annular welding space of which the inner diameter is less than the intended bore diameter, joining said stub to said wall by fusion depositing weld metal circumferentially of the stub within said annular welding space, removing weld metal from the root of the weld by a boring operation initiated within the stub at the intended diameter and continuing into said wall at the same diameter for a distance sufficient to remove said flange, and forming in the metal of the vessel wall an orifice which provides communication between the interior of the vessel and the bore of the stub and at least a part of which orifice is of restricted cross section relative to the intended bore of the stub.

References Cited in the file of this patent

UNITED STATES PATENTS

| Number | Name | Date |
|---|---|---|
| 1,741,121 | Winslow | Dec. 24, 1929 |
| 1,839,909 | Weatherhead | Jan. 5, 1932 |
| 1,911,375 | Lucke | May 30, 1933 |
| 1,937,604 | Taylor | Dec. 5, 1933 |
| 1,966,403 | Durham | July 10, 1934 |
| 2,060,014 | Barnes | Nov. 10, 1936 |
| 2,094,495 | Robinson | Sept. 28, 1937 |
| 2,183,043 | Kerr | Dec. 12, 1939 |
| 2,226,496 | Jacocks | Dec. 24, 1940 |
| 2,257,335 | Evans | Sept. 30, 1941 |
| 2,262,212 | Stone | Nov. 11, 1941 |
| 2,268,343 | Phillips | Dec. 30, 1941 |
| 2,361,636 | Koppel | Oct. 31, 1944 |
| 2,528,040 | Crouch | Oct. 31, 1950 |
| 2,528,280 | Lyon | Oct. 31, 1950 |

FOREIGN PATENTS

| Number | Country | Date |
|---|---|---|
| 17,227 | Great Britain | of 1909 |
| 528,233 | Great Britain | Oct. 24, 1940 |